(12) United States Patent
Schick et al.

(10) Patent No.: US 10,295,431 B1
(45) Date of Patent: *May 21, 2019

(54) SMART CARPET, PAD, OR STRIP FOR LEAK DETECTION AND LOSS MITIGATION

(71) Applicant: STATE FARM MUTUAL AUTOMOBILE INSURANCE COMPANY, Bloomington, IL (US)

(72) Inventors: Sean W. Schick, Saratogo, CA (US); Steven J. Harris, Saratogo, CA (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/038,268

(22) Filed: Jul. 18, 2018

Related U.S. Application Data

(60) Provisional application No. 15/085,597, filed on Mar. 30, 2016, provisional application No. 62/142,173, filed on Apr. 2, 2015.

(51) Int. Cl.
*G01M 3/16* (2006.01)
*G06Q 50/16* (2012.01)
*G06Q 40/08* (2012.01)

(52) U.S. Cl.
CPC .............. *G01M 3/16* (2013.01); *G06Q 40/08* (2013.01); *G06Q 50/163* (2013.01)

(58) Field of Classification Search
CPC ........ G01M 3/16; G06Q 40/08; G06Q 50/163
See application file for complete search history.

(56) References Cited

U.S. PATENT DOCUMENTS

| | | |
|---|---|---|
| 8,004,415 B2 | 8/2011 | Boss |
| 9,885,597 B2 | 2/2018 | Stangl |
| 2005/0162280 A1 | 7/2005 | Hayashida |
| 2006/0012485 A1 | 1/2006 | Tacilauskas |
| 2014/0317954 A1 | 10/2014 | McCallum |

*Primary Examiner* — Seahvosh Nikmanesh

(57) ABSTRACT

A system for detecting a leak or spill and mitigating losses resulting therefrom comprises a floor covering and a software application. The floor covering includes a sensor assembly, a processing element, and a transmitter. The sensor assembly generates information when exposed to liquid. The processing element determines a location of the liquid based upon the information from the sensor assembly. The transmitter transmits data regarding the liquid. The software application executes on an electronic device and is operable to receive data from the floor covering regarding the liquid; display a message that liquid has been detected on the floor covering; calculate an area of the liquid; determine whether a leak is still occurring and if so, shut an electronically controllable valve; transmit data regarding the liquid to an insurance provider; and/or receive insurance-related information from the insurance provider, such as information related to a proposed insurance claim or estimated damage.

20 Claims, 5 Drawing Sheets

SMART CARPET, PAD, OR STRIP FOR LEAK DETECTION AND LOSS MITIGATION

RELATED APPLICATIONS

The current patent application is a continuation of and claims the benefit of U.S. patent application Ser. No. 15/085,597, entitled "SMART CARPET, PAD, OR STRIP FOR LEAK DETECTION AND LOSS MITIGATION", filed Mar. 30, 2016, which is a non-provisional patent application that claims priority benefit with regard to all common subject matter to U.S. Provisional Application Ser. No. 62/142,173, titled "SMART CARPET, PAD, OR STRIP FOR LEAK DETECTION AND LOSS MITIGATION", filed Apr. 2, 2015. The listed earlier-filed applications are hereby incorporated by reference in their entireties into the current patent application.

FIELD OF THE INVENTION

The present disclosure generally relates to detecting the presence of liquids and, more particularly to systems and methods for detecting a leak or spill from a liquid source in proximity to a floor covering.

BACKGROUND

Many houses and other residential dwellings include carpets or rugs that cover at least a portion of their flooring. These carpets or rugs are often subject to liquid spills or leaks. For example, people can spill drinks on them, pets can have accidents on them, and fish tanks, appliances such as washing machines and dishwashers, and faulty household plumbing can leak onto them. The liquids may damage the carpet or rug itself.

But perhaps more critical damage may occur to the structures beneath the carpet when liquids soak through. Wood floors and ceilings of rooms below can sustain water damage that may lead to greater cost repair or replacement. In addition, leaks may occur in a part of the house that is not frequented, so the homeowner may not immediately be aware of a problem. Carpets may not dry out very quickly, and moisture remaining in a carpet may lead to the growth of mold, which in turn may present health risks.

Liquid spills and leaks may also be problematic in non-residential settings. For example, in industrial settings, water and other liquids are often used as part of a process for manufacturing or production. In other settings, large volumes of liquids may be stored as part of an ongoing process or for later usage. Quickly detecting leaks in these settings might help to reduce financial loss.

BRIEF SUMMARY

Embodiments of the present technology relate to systems, computer-implemented methods, and software on computer-readable media for detecting a leak or spill and mitigating losses resulting therefrom. The embodiments provide for a floor covering with a sensor assembly which is operable to detect a liquid. Once a liquid is detected, the floor covering may communicate with a software application executing on an electronic device. The software application may alert a responsible party, emergency or security services, and/or an insurance provider, if necessary.

In a first aspect, a system for detecting a leak or spill and mitigating losses resulting therefrom may be provided. The system may comprise a floor covering and a software application. The floor covering may include a sensor assembly, a processing element, and/or a transmitter. The sensor assembly may generate information when exposed to liquid. The processing element may determine a location of the liquid based upon the information from the sensor assembly. The transmitter may transmit data regarding the liquid. The software application may execute on an electronic device that includes a memory element and a processing element. The software application may be operable to (1) receive data from the floor covering regarding the liquid, (2) display a message that liquid has been detected on the floor covering, (3) calculate an area of the liquid, transmit data regarding the liquid to an insurance company or other entity (such as a home owner or building operator/owner), (4) receive insurance-related or other data regarding an insurance policy, estimated damage to a dwelling, a proposed insurance claim, the filing of an insurance claim, repair company information, and/or other insurance-related information from the insurance company or other entity; and/or display the insurance-related or other information received on a display screen for user or insurance customer review, approval, or modification to facilitate mitigating damage and/or handling insurance claims associated with the damage. The system may include additional, less, or alternate functionality, including that discussed elsewhere herein.

In another aspect, a computer-implemented method for mitigating losses resulting from a leak or spill may be provided. The method may include, via one or more processors: (1) receiving data from a floor covering, the data including coordinates of an exposure to liquid on the floor covering; (2) calculating an area covered by the liquid; (3) calculating a time duration of change of the area covered by the liquid; (4) transmitting information regarding the liquid on the floor covering to an insurance company or other entity (such as a home owner or building operator/owner); (5) receiving insurance-related or other information from the insurance company or other entity, such as information regarding an insurance policy, estimated damage to a dwelling, a proposed insurance claim, the filing of an insurance claim, repair company information, and/or other insurance-related information; and/or (6) displaying the insurance-related or other information on a display screen to facilitate insurance customer review, the handling of insurance claims; and/or mitigating the losses caused by the leak or spill. The method may include additional, less, or alternate actions, including those discussed elsewhere herein.

In yet another aspect, a computer-readable medium for mitigating losses resulting from a leak or spill may be provided. The computer-readable medium may include an executable program stored thereon, wherein the program includes processor executable instructions and instructs a processing element of a network computing device to perform the following steps: (1) receiving data from a floor covering, the data including coordinates of an exposure to liquid on the floor covering; (2) calculating an area covered by the liquid; (3) calculating a time duration of change of the area covered by the liquid; (4) transmitting information regarding the liquid on the floor covering to an insurance company or other entity; and/or (5) receiving (and then displaying) insurance-related or other information from the insurance company or other entity, such as information regarding a proposed insurance claim, the filing of an insurance claim, or other information discussed herein. The computer-readable medium may include instructions having additional, less, or alternate functionality, including that discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

Figure 1:
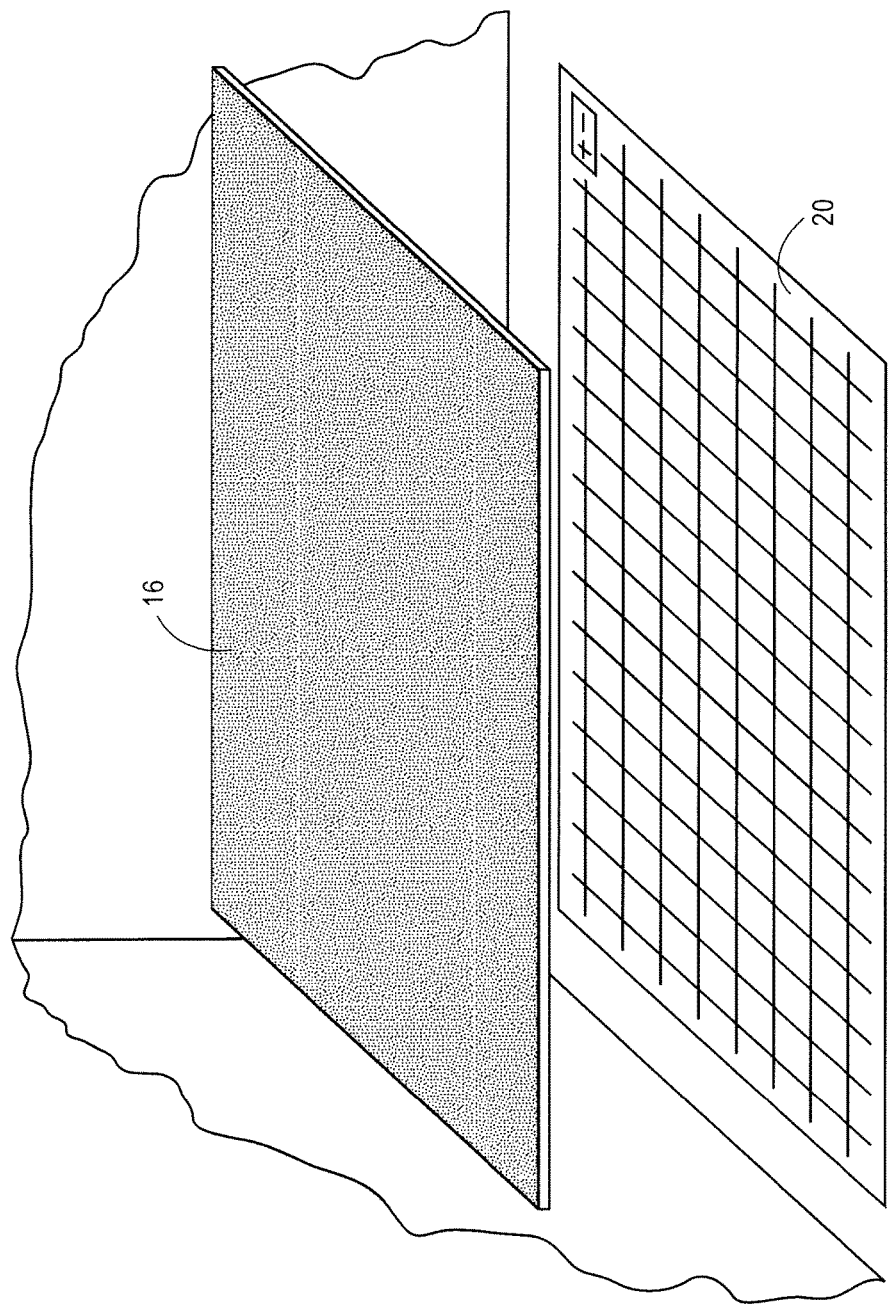
FIG. 1 is a perspective environmental view of a portion of a room in which an exemplary floor covering is placed underneath a carpet.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments described in this patent application and other possible embodiments may relate to, inter alia, systems and methods, including floor coverings and software applications, that are operable to detect a leak or spill from a liquid source in proximity to the floor covering and to mitigate the loss resulting from the leak or spill. The floor covering may be a carpet or rug, or may be a pad or part of a pad that is placed underneath a carpet or rug. The floor covering may include a sensor assembly, a processing element, and/or a transmitter.

The sensor assembly may generally detect the presence of a liquid and may include an array of sensor elements, such as a grid of conductive wires. The sensor assembly may generate one or more signals when liquid is detected. The processing element may be able to receive the signals from the sensor assembly. The processing element may also be coupled to a memory element which stores an operating program for the floor covering. The transmitter may be able to wirelessly transmit data that it receives from the processing element.

In one aspect, the floor covering may function as follows. In the presence of liquid on the floor covering, the sensor assembly may detect the liquid and may send one or more signals to the processing element that indicate the location of the liquid, such as X-coordinates and Y-coordinates. Based upon the location information from the sensor assembly, the processing element may compute the area covered by the liquid. It may also compute the time duration of the change in area and the rate of change in area. These computations may help the processing element determine the severity of the liquid and what actions to take based upon the severity.

For example, if the area of the liquid grows rapidly, say, over a time period of 3-4 seconds, and stops, then the event was likely just a spill, such as a drink spill, and no significant additional action need be taken. Alternatively, if the area of the liquid grows slowly or rapidly, over a longer period of time, say, greater than 10 seconds, then the event is likely a leak that could be ongoing.

In this case, the processing element may utilize the transmitter to send a signal to a valve to shut off the flow of liquid causing the leak. In a residential setting, the valve may be the main water shutoff for the house. In an industrial setting, the valve may include one or more valves that control liquid flow in the area of a facility where the floor covering is placed. Additionally or alternatively, in either setting, the processor element may determine one or more remotely operated values (such as solenoid valves) in the vicinity of the spill or leak, and then shut those valves (as they may be a likely source of the liquid). If there is no automated valve control available, then the processing element may send a signal to emergency or security services to alert them to the location of the leak. In any case, the processing element may also utilize the transmitter to send a signal to a responsible party, such as the owner of the house or the manager of the facility, which is typically received by an electronic device.

The software application may generally run on the electronic device, in possession of the responsible party and including at least a screen and a communication element. Upon receipt of the signal from the floor covering, the software application may display a message on the screen that either a spill or a leak has been detected on the floor covering. The software application may also display the location or size of the spill or leak, and/or if the leak is ongoing.

In some embodiments, the software application may also communicate with the insurance company or other entity of the responsible party. The software application may transmit information regarding the spill or leak, such as the location or the size of the spill or leak, to the insurance company. The software application may then receive information from the insurance company regarding a claim for the spill or leak, such as an amount of payment for damages, adjustments to premiums (if applicable), and the like. The software application may then display the information, as well as an option to notify the insurance company to file the claim.

In other embodiments, the software application may display an icon or other user interface object that allows the responsible party the option of contacting the insurance company, to report the incident and file a claim. Additionally or alternatively, the insurance provider (or an insurance provider remote server or processor) may use the information regarding the location or size of the spill or leak to determine, and then communicate or transmit recommended actions to a home owner or other insured to remedy the situation or fix the damage. For instance, the insurance provider (or an insurance provider remote server or processor) may communicate or transmit contact information of repair companies that may be qualified to perform necessary repair work (or give an estimate of repair work), or contact a repair company directly with the insurance customer's permission.

Specific embodiments of the technology will now be described in connection with the attached drawing figures. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense. The scope of the present invention is defined only by the appended claims, along with the full scope of equivalents to which such claims are entitled.

I. Exemplary System

Figure 2:
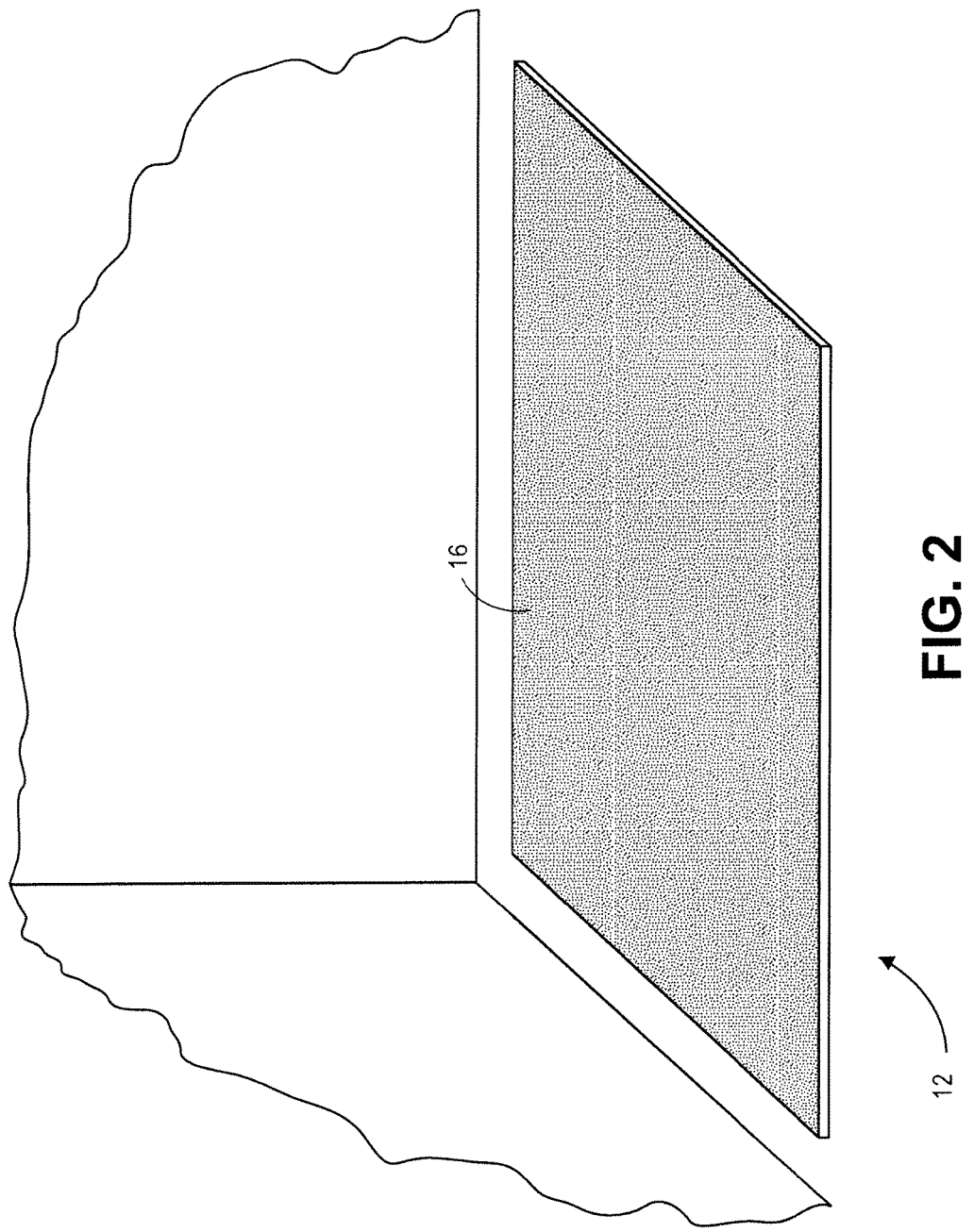
FIG. 2 is a perspective environmental view of the room of FIG. 1, wherein the exemplary carpet is on top of the floor covering.

FIGS. 1-6 illustrate an exemplary system 10, constructed in accordance with various embodiments of the current invention, for detecting a leak or spill and mitigating losses resulting therefrom. The system 10 may broadly comprise a floor covering 12 and a software application 14. FIGS. 1 and 2 depict an exemplary environment in which embodiments of the floor covering 12 may be utilized.

The environment depicted may be in a residential setting, such as a bedroom, a living room, a dining room, a laundry room, or the like. Alternatively, the environment may be an industrial setting, such as in a laboratory or production area.

Figure 3:
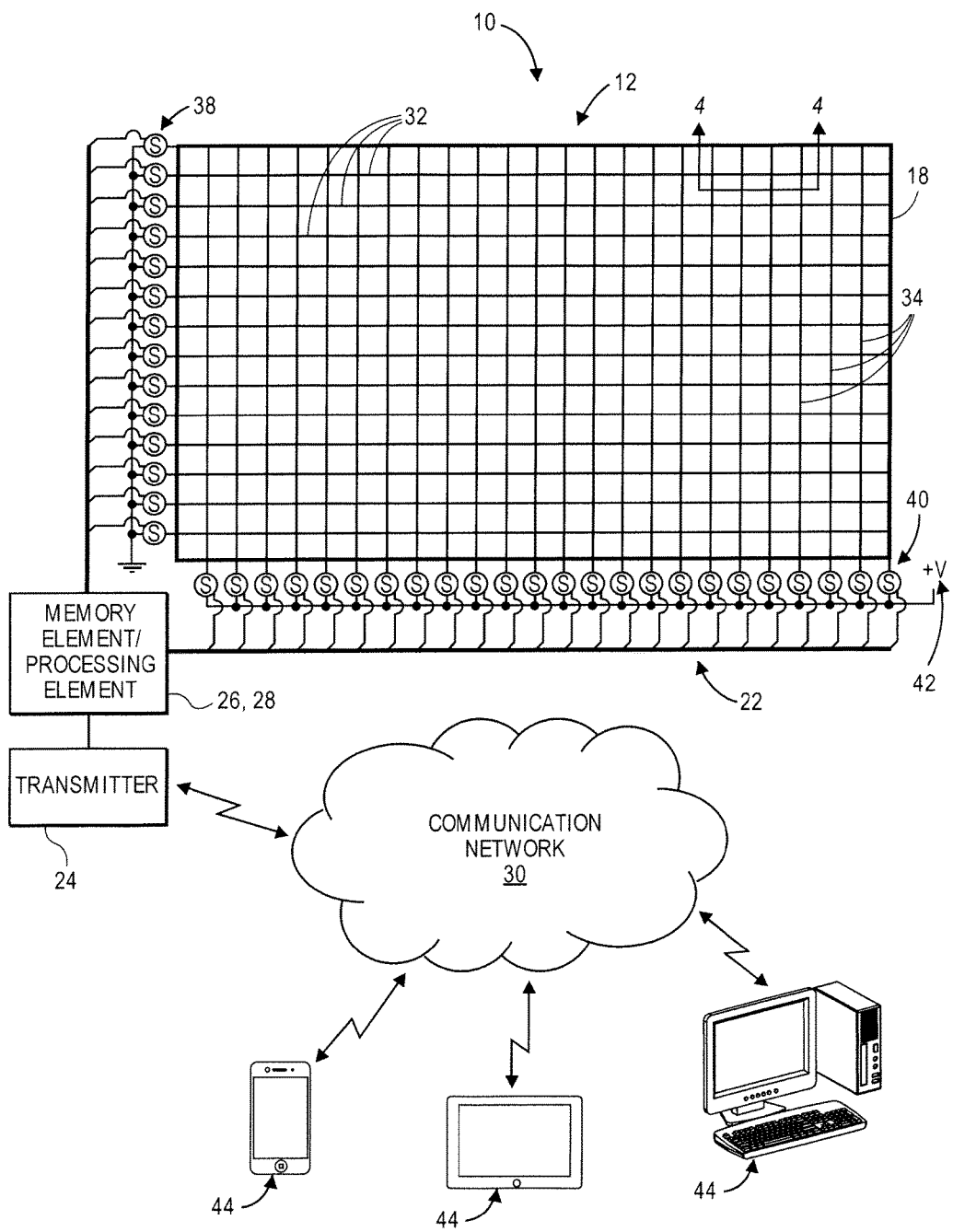
FIG. 3 is a block schematic view of an exemplary system for detecting a leak or spill and mitigating losses resulting therefrom, the system including the exemplary floor covering.
Figure 4:
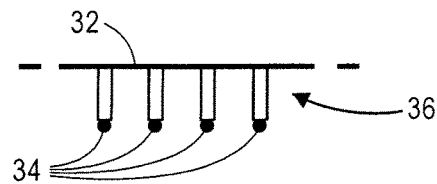
FIG. 4 is a sectional view of a portion of the exemplary floor covering of FIG. 3, cut along the line 4-4.
Figure 5:
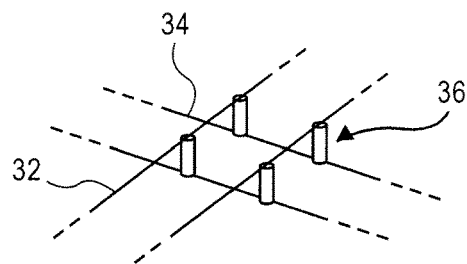
FIG. 5 is a perspective view of the section of the exemplary floor covering of FIG. 4.
Figure 6:
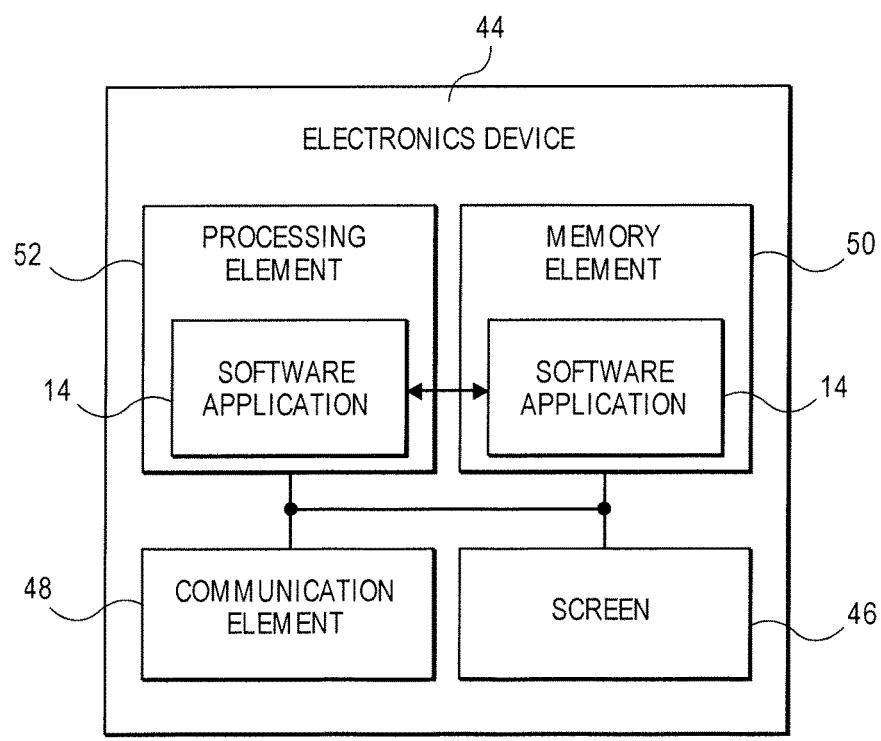
FIG. 6 is a block schematic diagram of an electronics device that is operable to execute an exemplary software application which is a component of the exemplary system of FIG. 3.

In some embodiments, the floor covering 12 may include or may be embedded in a carpet 16 or rug. In exemplary embodiments, the floor covering 12 may be a self-contained, standalone component that is placed directly on the floor, as shown in FIG. 1 which depicts the carpet 16 raised so as to reveal the floor covering 12. In FIG. 2, the carpet 16 is placed on top of the floor covering 12. As shown in FIG. 3, the floor covering 12 may broadly comprise a frame 18, a structural medium 20, a sensor assembly 22, a transmitter 24, a memory element 26, and/or a processing element 28. The floor covering 12 may interact or interface with a communication network 30 to transmit data. Generally, the communication network 30 may include local area networks, metro area networks, wide area networks, cloud networks, the Internet, and the like, or combinations thereof, which are interconnected through a combination of wired and wireless circuits.

The frame 18 generally provides structural support for the sensor assembly 22. The frame 18 may be constructed from rigid material and may include at least four beams or bars connected to form a rectangular or square shape. The frame 18 may be positioned at the perimeter of the sensor assembly 22.

Like the frame 18, the structural medium 20 may generally provide structural support for the sensor assembly 22 and may be embodied by a foam sheet, a dual layer film, an elongated membrane, or the like. The structural medium 20 may typically be formed from porous material to allow liquids to penetrate, flow through, or soak. In some embodiments, the floor covering 12 may include both the frame 18 and the structural medium 20. In other embodiments, the floor covering 12 may include either the frame 18 or the structural medium 20.

The sensor assembly 22 generally detects the presence of liquids and generates at least one signal that may be used to determine the location of the liquid. In some embodiments, the sensor assembly 22 may include components or materials that undergo a chemical reaction in the presence of water or other liquids. In exemplary embodiments as shown in FIG. 3, the sensor assembly 22 may include a first array of conductors 32, a second array of conductors 34, a plurality of insulators 36, a first array of sensors 38, and a second array of sensors 40.

Each conductor of the first array 32 and the second array 34 may typically be an unshielded wire of conductive material such as metals like copper, iron, nickel, or the like. The conductors of the first array 32 may be spaced apart and in parallel with one another oriented in a first direction. The conductors of the second array 34 may be spaced apart and in parallel with one another oriented in a second direction, orthogonal to the first direction.

Each insulator 36 may be constructed from electrically insulating material, such as rubber, plastic, or glass, and may have a cylindrical or elongated box shape. In some embodiments, each insulator 36 may include two grooves, each on an opposing end thereof and oriented in orthogonal directions.

Each sensor of the first array 38 and the second array 40 may be able to detect electrical current flow and/or may include passive or active electronic circuits that are responsive to electric current flow. In general, each sensor 38, 40 may include an output that generates information when electric current flow is detected. In some embodiments, the output may generate a signal when electric current flow is detected. In other embodiments, the output may generate a unique data code, such as a binary digital code, that represents the position of the sensor 38, 40. Typically, the relevant sensors 38, 40 generate information as long as liquid is present between the associated conductors of the first array 32 and the second array 34.

The sensor assembly 22 may be formed as follows. The first array of conductors 32 may be placed over or on the second array of conductors 34, such that the combination of the two arrays 32, 34 forms a grid. In various embodiments, one insulator 36 may be placed between the conductors 32, 34 at each grid point, such that the first array of conductors 32 crosses over the second array of conductors 34 without the conductors physically contacting one another.

Each sensor of the first array 38 may be integrated with one conductor of the first array 32. Each sensor of the second array 40 may be integrated with one conductor of the second array 34. One end of each conductor of the first array 32 may be electrically connected to a first conductive rail or wire, which is then connected to a voltage supply 42. An exemplary voltage supply 42 may include one or more batteries. Alternatively, the voltage supply 42 may include AC to DC power conversion circuitry that receives AC voltage from a wall outlet. Thus, in some embodiments, the voltage supply may include an electrical cord. One end of each conductor of the second array 34 may be electrically connected to a second conductive rail or wire, which is then connected to electrical ground.

The transmitter 24 may generally communicate through the communication network 30 with external devices and systems when a spill or leak is detected. The transmitter 24 may include signal or data transmitting circuits, such as antennas, amplifiers, filters, mixers, oscillators, digital signal processors (DSPs), and the like. The transmitter 24 may establish communication wirelessly by utilizing radio frequency (RF) signals and/or data that comply with communication standards such as cellular 2G, 3G, or 4G, Institute of Electrical and Electronics Engineers (IEEE) 802.11 standard such as WiFi, IEEE 802.16 standard such as WiMAX, Bluetooth™, or combinations thereof. In addition, the transmitter 24 may utilize communication standards such as ANT, ANT+, Bluetooth™ low energy (BLE), the industrial, scientific, and medical (ISM) band at 2.4 gigahertz (GHz), or the like. The transmitter 24 may be in communication with the processing element 28 and the memory element 26.

The memory element 26 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 26 may be embedded in, or packaged in the same package as, the processing element 28. The memory element 26 may include, or may constitute, a "computer-readable medium". The memory element 26 may store the instructions, code, code segments, software, firmware, programs, applications, apps, services, daemons, or the like that are executed by the processing element 28. The memory element 26 may also store settings, data, documents, sound files, photographs, movies, images, databases, and the like.

The processing element 28 may include processors, microprocessors, microcontrollers, digital signal processors (DSPs), field-programmable gate arrays (FPGAs), analog and/or digital application-specific integrated circuits (ASICs), or the like, or combinations thereof. The processing element 28 may generally execute, process, or run instructions, code, code segments, software, firmware, programs, applications, apps, processes, services, daemons, or the like. The processing element 28 may also include hardware components such as finite-state machines, sequential and combinational logic, and other electronic circuits that can perform the functions necessary for the operation of the current invention. The processing element 28 may be in communication with the other electronic components through serial or parallel links that include address busses, data busses, control lines, and the like.

Through hardware, software, firmware, or various combinations thereof, the processing element 28 may be configured or programmed to perform the following operations. The processing element 28 may receive communication, either signals or data, from the sensor assembly 22. In embodiments in which the processing element 28 receives signals, each signal represents at least part of a coordinate. For example, each signal from the first array of sensors 38 (integrated with the first array of conductors 32) may represent an X-coordinate, while each signal from the second array of sensors 40 (integrated with the second array of conductors 34) may represent a Y-coordinate. In embodiments in which the processing element 28 receives data, each sensor 38, 40 may transmit a unique code, such as a number, which represents the location of the sensor 38, 40.

Upon receipt of signals or data from the sensor assembly 22, the processing element 28 may determine the location and size of the liquid. The processing element 28 may also communicate data about the liquid to the transmitter 24 and may instruct the transmitter 24 to transmit the data to the communication network 30. The data about the liquid may include an alert that a spill or leak has occurred, the location of the liquid, such as a center location or a location of the corners of the area, whether the area of the liquid is growing, and the like. The processing element 28 may update the data at regular intervals and may communicate the updated data to the transmitter 24 for transmission.

The floor covering 12 may be formed as follows. The sensor assembly 22 may be placed on or attached to the frame 18, if the frame 18 is included. Typically, opposing ends of each conductor attach to opposing members of the frame 18, as seen in FIG. 3. The transmitter 24, the memory element 26, and the processing element 28 may be implemented on a printed circuit board or similar package. The output of each sensor 38, 40 may be electrically connected to the processing element 28.

In some embodiments, each sensor 38, 40 output may be electrically connected to an input of the processing element 28. In such embodiments, each sensor 38, 40 may output a signal. In other embodiments, the output of each first sensor 38 may be connected to a first electrical bus which is connected to a first input of the processing element 28, and the output of each second sensor 40 may be connected to a second electrical bus which is connected to a second input of the processing element 28. In such embodiments, each sensor 38, 40 may output coded data.

If the structural medium 20 is included, the rest of the components may be placed in or on the structural medium 20, such as between layers of porous film or within porous foam. In some embodiments, the floor covering 12 may be embedded in a carpet or rug, with the conductors placed between groups of carpet or rug fibers and the sensors 38, 40 placed at the edge of the carpet or rug.

The floor covering 12 may function as follows. Once the floor covering 12 is in place, in or under a carpet or rug, and the voltage supply 42 is receiving electrical power from a wall outlet, the floor covering 12 is ready to detect a spill or leak. When liquid is exposed to or contacts the floor covering 12, an electrical short circuit occurs between a least one conductor of the first array 32 and at least one conductor of the second array 34. As a result, electric current flows through at least one first sensor 38 and at least one second sensor 40. These sensors 38, 40 send information, including signals or data, to the processing element 28 which may determine the location of the liquid. The processing element 28 may also instruct the transmitter 24 to send an alert, as well as information regarding the location of the liquid. The sensor assembly 22 may continuously communicate with the processing element 28 while liquid is present on the floor covering 12. In turn, the processing element 28 may update the transmitted information at regular intervals.

The software application 14 may execute on an electronic device 44, such as a mobile device (e.g., a smart watch or bracelet, smart glass or glasses, a smart phone, a personal data assistant (PDA), a tablet computer, a laptop computer, a netbook, a notebook, etc.), a desktop computer, or other computing device, including those configured for wireless communication and data transmission. The user of the electronic device 44 may be a responsible party, such as the owner of a house or the manager of a facility in which the floor covering 12 is located. The electronic device 44 may comprise a screen 46, a communication element 48, a memory element 50, and/or a processing element 52.

The screen 46 may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), or the like, or combinations thereof. The screen 46 may possess a square or a rectangular aspect ratio and may be viewed in either a landscape or a portrait mode. In various embodiments, the screen 46 may also include a touchscreen occupying the entire screen 46 or a portion thereof so that the screen 46 functions as part of the user interface. The touchscreen may allow the user to interact with the electronic device 44 by physically touching, swiping, or gesturing on areas of the screen 46.

The communication element 48 may include signal or data transmitting and receiving circuits, such as antennas, amplifiers, filters, mixers, oscillators, DSPs, and the like. The communication element 48 may establish communication wirelessly by utilizing RF signals and/or data that comply with communication standards such as cellular 2G, 3G, or 4G, IEEE 802.11 standard such as WiFi, IEEE 802.16 standard such as WiMAX, Bluetooth™, or combinations thereof. In addition, the communication element 48 may utilize communication standards such as ANT, ANT+, BLE, the ISM band at 2.4 GHz, or the like. Alternatively, or in addition, the communication element 48 may establish communication through connectors or couplers that receive metal conductor wires or cables which are compatible with networking technologies such as ethernet. The communication element 48 may be in communication with the processing element 52 and the memory element 50.

The memory element 50 and the processing element 52 may be substantially similar in structure to the memory element 26 and the processing element 28. The memory element 50 may store at least a portion of the software application 14 and the processing element 52 may execute at least a portion of the code of the software application 14.

The communication element 48 of the electronic device 44 may receive the data from the transmitter 24 of the floor covering 12. The software application 14 may perform a plurality of actions once the data is received. Firstly, the software application 14 may interrupt or close any other software application that is currently active on the electronic device 44 and may display a message on the screen 46 that either a spill or a leak has been detected on the floor covering 12. Based upon the location information of the liquid, the software application 14 may determine the area covered by the liquid. As the communication element 48 continues to receive data from the floor covering 12, the software application 14 may also calculate a time duration of the change in area and/or a rate of change in area.

The time duration of growth of the liquid may be a factor in determining the severity of the liquid and what actions to take based upon the severity. The software application 14 may determine whether the time duration of growth is greater than a predetermined threshold. The software application may take no significant action if the time duration of growth is less than the threshold, but may take greater action if the time duration of growth is greater than the threshold. For example, if the area of the liquid grows, say, over a time period of 3-5 seconds, and stops, then the event was likely just a spill, such as a drink spill, and no significant action other than cleanup need be taken. Alternatively, if the area of the liquid grows over a longer period of time, say, greater than 10 seconds, then the event is likely a leak that may be ongoing.

In some embodiments, the software application 14 may utilize the communication element 48 to automatically send a signal to emergency or security services to alert them to the location of the leak. Alternatively, the software application 14 may present the user with an option to contact emergency or security services, or an insurance provider.

In other embodiments, the software application 14 may automatically send a signal to a valve (such as an electronically controllable valve) to shut off the flow of liquid causing the leak. The software application 14 may also send a signal to a liquid pump (e.g., sump or other de-watering pump) to activate to help remove the liquid. In a residential setting, the valve may be the main water shutoff for the house. In an industrial setting, the valve may include one or more valves that control liquid flow in the area where the floor covering is placed. Alternatively, the software application 14 may present the user with an option to shut off the valve or activate the pump, or otherwise remotely control specific valves or pumps once a leak has been detected, such as via wireless communication or data transmission from a mobile device.

The software application 14 may also display on the screen 46 the location of the floor covering 12 and the location or size of the spill or leak, and/or if the leak is ongoing. In some embodiments, the software application 14 may also communicate with the insurance company or other entity of the responsible party. The software application 14 may transmit information regarding the spill or leak, such as the location or the size of the spill or leak, to the insurance company.

The software application 14 may then receive information from the insurance company regarding a proposed claim for the spill or leak, such as an amount of payment for damages, adjustments to premiums (if applicable), and the like. The software application 14 may then display the information, as well as an option to notify the insurance company to file the claim (or otherwise provide approval of the claim and/or permission to file the claim). In other embodiments, the software application 14 may display an icon or other user interface object that allows the responsible party the option of contacting the insurance company to report the incident and file a claim. The software application 14 may also display a claim form for the user to fill out and file, if desired.

In one embodiment, various ones of the components shown in the Figures may be powered by a low voltage source. For instance, FIG. 1 depicts a battery as one power source for the smart carpet or smart walling, and their associated electronic components. Additionally or alternatively, the smart carpet or smart walling may have an electric plug for plugging into a building's electrical system.

II. Exemplary Computer-Implemented Method

Figure 7:
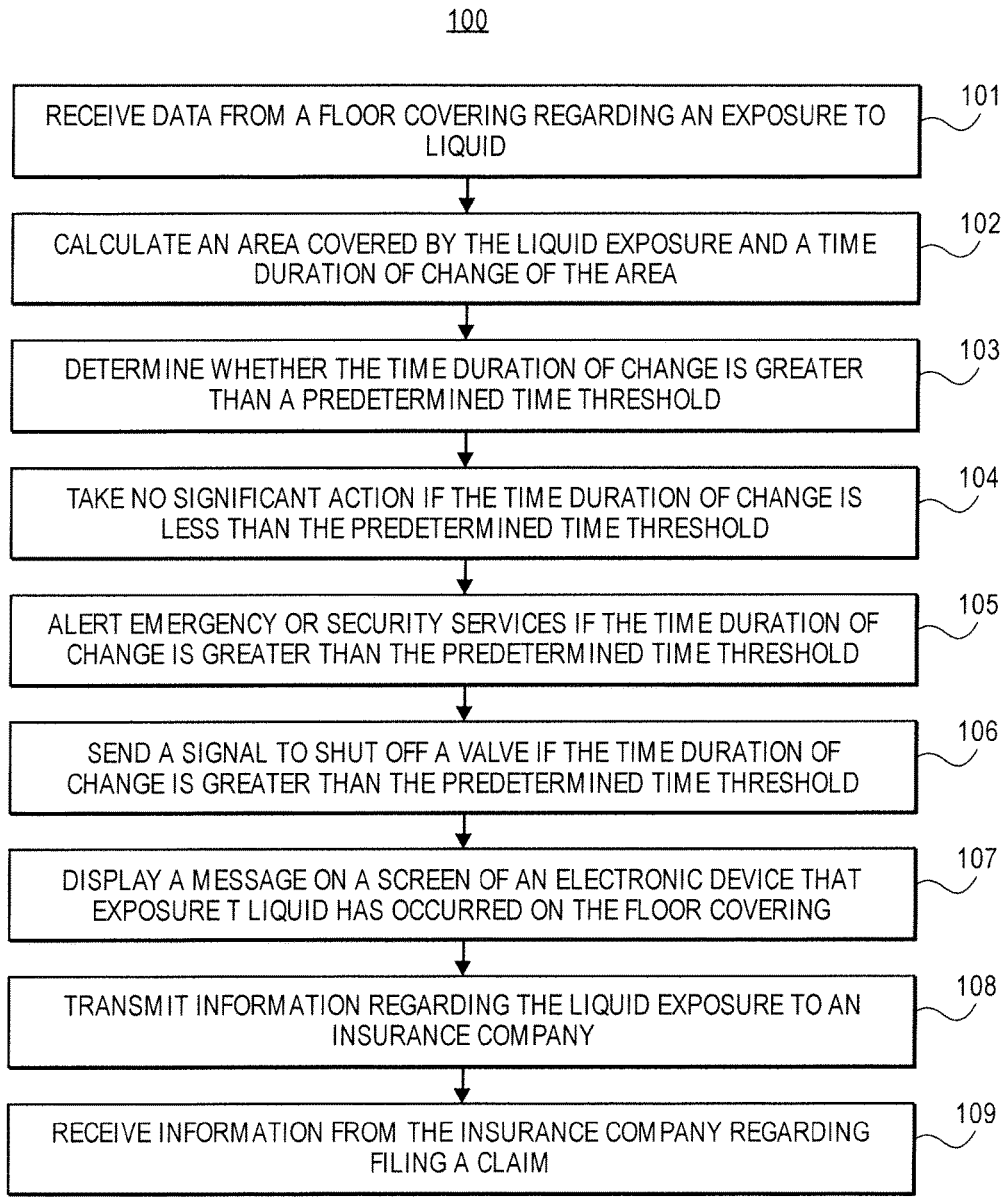
FIG. 7 is at least a portion of an exemplary computer-implemented method for mitigating losses resulting from a leak or spill.

FIG. 7 depicts a listing of steps of an exemplary computer-implemented method 100 for mitigating losses resulting from a leak or spill. The steps may be performed in the order shown in FIG. 7, or they may be performed in a different order. Furthermore, some steps may be performed concurrently as opposed to sequentially. In addition, some steps may be optional. The steps of the computer-implemented method 100 may be performed by a processing element 52 of an electronic device 44, except where otherwise noted.

Referring to step 101, data may be received by a communication element 48 of the electronic device 44 from a floor covering 12 regarding an exposure to liquid. The floor covering 12 may be implemented on a floor in a residential or industrial setting. The floor covering 12 may be operable to detect the exposure to liquid and may transmit data on a repeated basis regarding the liquid. The data may include a location, coordinates, corner-to-corner extents, or a size of the liquid, or combinations thereof. The electronic device 44 may be embodied by a mobile device (e.g., a smartphone or tablet), a personal computer, or the like. The electronic device 44 may be in the possession of the responsible party or owner of the floor covering 12.

Referring to step 102, an area of the liquid may be calculated along with a time duration of change of the area. Typically, when the floor covering 12 is exposed to liquid during a spill, the area covered by the liquid may quickly grow and then stop after a short period of time. When the floor covering 12 is exposed to liquid during a leak, the area covered by the liquid may quickly, or slowly, grow over an extended period of time. The processing element 52 of the electronic device 44 may repeatedly or continually determine the time duration of growth of the area of the liquid.

Referring to steps 103, 104, 105, and 106, it is determined whether the time duration of change of the area of the liquid is greater than a predetermined time threshold. If the area of the liquid stops changing, or changes only a small amount, before the predetermined time threshold, then the liquid event was likely a spill and no significant action other than cleanup need be taken. If the time duration of change of the area of the liquid is greater than the predetermined time threshold, for example approximately 10 seconds, then one or more of the following may be performed. An alert may automatically be sent to an insured or home owner, or emergency or security services to inform them to the location of the leak. If the infrastructure in a house or industrial building exists to automatically or electronically shutoff liquid flow valves, then a signal may automatically be sent to the valve in the vicinity of the floor covering 12 reporting the leak to shut off the flow of liquid.

Referring to step 107, a message may be displayed on a screen 46 of the electronic device 44 indicating that exposure to liquid has occurred on the floor covering 12. The location of the floor covering 12, as well as the location of the spill or leak, may also be displayed on the screen 46.

Referring to step 108, information regarding the liquid may be transmitted to an insurance company of the responsible party. The information may include the location of the liquid, the size of the liquid, and/or whether the liquid is a spill or a leak and possibly whether the leak is ongoing.

Referring to step 109, insurance-related information may be received from the insurance company. The insurance-related information may include a proposed insurance claim for an insured's review, approval, and/or modification. The insurance-related information may include an amount of payment for damages, an estimate to repair the estimated damage, adjustments to insurance premiums, rates, or discounts (if applicable), contact information for repair companies, and/or other insurance-related information. The information may be displayed to the responsible party, such as a home owner or an insured. The method may include additional, less, or alternate actions, including those discussed elsewhere herein.

III. Exemplary System for Detecting a Leak or Spill and Mitigating Losses Resulting Therefrom In a first aspect, a system for detecting a leak or spill and mitigating losses resulting therefrom may be provided. The system may comprise a floor covering and a software application. The floor covering may include a sensor assembly, a processing element, and/or a transmitter. The sensor assembly may generate information when exposed to liquid. The processing element may determine a location of the liquid based upon the information from the sensor assembly. The transmitter may transmit data regarding the liquid. The software application may execute on an electronic device that includes a memory element and/or a processing element. The software application may be operable to receive data from the floor covering regarding the liquid, display a message that liquid has been detected on the floor covering, calculate an area of the liquid, transmit data regarding the liquid to an insurance company, and/or receive insurance-related data, such as data regarding an insurance policy or a proposed or submitted claim, from the insurance company.

For instance, the sensor assembly may further include (i) a first array of conductors spaced apart, parallel to one another, and oriented in a first direction, and (ii) a second array of conductors spaced apart, parallel to one another, and oriented in a second direction, and orthogonal to the first direction. The second array of conductors may be overlaying the first array of conductors. The sensor assembly may include (iii) a first array of sensors, each sensor operable to detect electrical current flow and integrated with one conductor of the first array, and (iv) a second array of sensors, each sensor being operable to detect electrical current flow and integrated with one conductor of the second array. Each conductor of the first array may be electrically connected to a voltage supply, and each conductor of the second array may be electrically connected to electrical ground.

The sensor assembly may further include a plurality of insulators with each insulator positioned between one conductor of the first array and one conductor of the second array. Each sensor of the first array may generate information that indicates an X-coordinate of the liquid, and each sensor of the second array may generate information that indicates a Y-coordinate of the liquid.

The floor covering may include a quadrilateral frame to which the sensor assembly is attached. The floor covering may include a structural medium in which the sensor array is embedded. The software application may be further operable to determine a time duration of change of the area of the liquid. The software application may be further operable to determine whether the time duration of change is greater than a predetermined threshold, and contact emergency or security services if the time duration of change is greater than the predetermined threshold.

IV. Exemplary Computer Implemented Method for Mitigating Losses Resulting from a Leak or Spill In one aspect, a computer-implemented method for mitigating losses resulting from a leak or spill may be provided. The method may include: (1) receiving data from a floor covering, via one or more processors, the data including coordinates of an exposure to liquid on the floor covering; (2) calculating, via the one or more processors, an area covered by the liquid; (3) calculating, via the one or more processors, a time duration of change of the area covered by the liquid; (4) transmitting, under the direction or control of the one or more processors, information regarding the liquid on the floor covering to an insurance company; (5) receiving, via the one or more processors; insurance-related or other information from the insurance company, such as information regarding an insurance policy (or premium, rate, or discount), estimated damages to a dwelling, a proposed insurance claim, filing a claim, repair company information or other insurance-related information; and/or (6) displaying, via the one or more processors, the insurance-related or other information received on a display, such as a display of a mobile device, for review, approval; or modification of an insured or home owner. The method may include additional, less, or alternate actions, including those discussed elsewhere herein.

For instance; the method may also include: determining, via the one or more processors, whether the time duration of change of the area covered by the liquid is greater than a predetermined time threshold; and/or alerting; via the one or more processors, emergency or security services, an insurance provider, or a home owner or other insured if the time duration of change is greater than the predetermined threshold.

Additionally or alternatively, the method may include: (i) determining, via the one or more processors, that the leak has not stopped; (ii) determining, via the one or more processors, a source of the leak or a source valve in the vicinity of the leak; and/or (iii) remotely directing, via the one or more processors, the source valve to shut, such as via wired or wireless communication or data transmission. As a result, losses or damage caused by the leak may be mitigated.

In one aspect, the insurance-related information may include a proposed insurance or an estimate of damages (or an estimate of repair work to fix the damage) that is generated by the insurance provider or an insurance provider remote server or processor from computer analysis of the liquid data gathered. The proposed insurance or estimate of damages may be transmitted to the insured for their review and to facilitate handling an insurance claim. For instance; the insured may approve the proposed insurance claim for submission via their mobile device. Additionally or alternatively, the insured may submit a request for an estimate, or for repair work to be completed, to a repair company via their mobile device.

V. Exemplary Computer-Readable Medium for Mitigating Losses Resulting from a Leak or Spill In another aspect, a computer-readable medium for mitigating losses resulting from a leak or spill may be provided. The computer-readable medium may include an executable program stored thereon, wherein the program instructs a processing element of a network computing device to perform the following steps: (1) receiving data from a floor covering, the data including coordinates of an exposure to liquid on the floor covering; (2) calculating an area covered by the liquid; (3) calculating a time duration of change of the area covered by the liquid; (4) transmitting information regarding the liquid on the floor covering to an insurance company; and/or (5) receiving and displaying insurance-related or other information from the insurance company, such as information regarding an insurance policy, estimated damage to a dwelling, a proposed insurance claim, the filing of an insurance claim, repair company information, and/or other insurance-related information. The computer-readable medium may include additional; less; or alternate instructions, including those discussed elsewhere herein.

For instance, the program may further instruct the processing element to perform the additional steps of: determining whether the time duration of change of the area covered by the liquid is greater than a predetermined time threshold; and/or alerting emergency or security services if the time duration of change is greater than the predetermined threshold.

VI. Exemplary Damage Mitigation Methods

In one aspect, a computer-implemented method for mitigating losses resulting from a leak or spill may be provided. The method may include (1) receiving, via one or more processors, data from a floor (or wall) covering, the data including coordinates of an exposure to liquid on the floor covering; (2) determining or calculating, via the one or more processors, that a time duration that the liquid has been sensed exceeds a pre-determined threshold; (3) determining or calculating, via the one or more processors, an area covered by the liquid; (4) determining or calculating, via the one or more processors, a source valve in proximity to the area covered by the liquid (or otherwise determining, via the one or more processors, a source valve that; if closed, will stop, or likely stop, the leak or spill); and/or (5) directing, via the one or more processors, the source valve to automatically shut to stop the leak or spill and mitigate the damage caused by the leak or spill. The method may include additional, less, or alternate actions, including those discussed elsewhere herein.

For instance; the method may include transmitting; via the one or more processors, information regarding the liquid on the floor (or wall) covering to an insured, home owner, and/or an insurance provider. When the time duration of change of the area covered by the liquid is greater than a predetermined time threshold, the method further include alerting emergency or security services that the time duration of change is greater than the predetermined threshold.

The method may include transmitting, via the one or more processors, information regarding the liquid on the floor (or wall) covering to an insurance provider; and receiving (and then displaying), via the one or more processors; insurance-related information from the insurance provider to facilitate generating or handling insurance claims associated with the losses caused by the leak or spill. The insurance-related data received from the insurance provider may relate to: (a) a proposed insurance claim generated by the insurance provider or an insurance provider remote processor or server from computer analysis of the information regarding the liquid on the floor (or wall) covering transmitted to the insurance provider; (b) an estimate of damage generated by the insurance provider or an insurance provider remote processor or server from computer analysis of the information regarding the liquid on the floor (or wall) covering transmitted to the insurance provider; and/or (c) contact information for a repair company.

In another aspect, a computer-implemented method for mitigating losses resulting from a leak or spill may be provided. The method may include (1) receiving, via one or more processors, data from a floor (or wall) covering, the data including coordinates of an exposure to liquid on the floor covering; (2) determining or calculating, via the one or more processors; that a time duration that the liquid has been sensed exceeds a pre-determined threshold; (3) determining or calculating, via the one or more processors, an area covered by the liquid; and/or (4) transmitting; via the one or more processors, information regarding the liquid on the floor (or wall) covering (e.g., that an continuing leak or spill is presently occurring) to an insured, home owner, emergency or security services, and/or an insurance provider to facilitate mitigation of the damages caused by the leak or spill or facilitate intervention to manually stop the leak or spill. The method may include additional, less, or alternate actions, including those discussed elsewhere herein.

For instance, the method may include receiving, via the one or more processors, insurance-related information from the insurance provider; and displaying, via the one or more processors, the insurance-related information; the insurance-related information being an proposed insurance claim associated with the damages for the insured to review and approve via their mobile device. The method may include receiving, via the one or more processors, insurance-related information from the insurance provider, wherein the insurance-related data received from the insurance provider relates to: (i) a proposed insurance claim generated by the insurance provider or an insurance provider remote processor or server; (ii) an estimate of damage generated by the insurance provider or an insurance provider remote processor or server; and/or (iii) contact information for a repair company.

The method may include (a) determining, via the one or more processors, a remotely, operable valve in the vicinity of the leak or spill, or otherwise an appropriate valve to shut to stop, or estimated or likely to stop, the leak or spill; and (b) directing, via the one or more processors, the remotely operable valve to automatically shut to alleviate further damage caused by the leak or spill.

The remotely operable valve may be a water shutoff valve, and/or the source valve mentioned above. The remotely operable valve may be a "smart" valve, and may include various electronic components, such as one or more processors, memory units, clocks, transceivers, actuators, etc. The smart valve may include various types of sensors, such as flow or pressure sensors that may indicate abnormal flow or conditions. When a leak is detected via the one or more processors; the smart valve may be remotely controlled (under processor control) to shut or close, and thus stop or mitigate the damage being caused by the spill. The smart valve may be controlled via wired or wireless communication and/or data transmission.

Additionally or alternatively, the method may include (i) determining, via the one or more processors, that the leak has not stopped or is still occurring after a predetermined amount of time, such as 2-3 seconds; (ii) determining or selecting, via the one or more processors, a source of the leak or a source valve in the vicinity of the leak; and/or (iii) remotely directing, via the one or more processors, the source valve to shut, such as via wired or wireless communication or data transmission, to facilitate mitigating the damage caused by the leak.

VIII. Other Embodiments

The preferred embodiments discussed herein relate to a floor coveting. For instance the floor covering may be a carpet or rug, or may be a pad or part of a pad that is placed underneath a carpet or rug. Other embodiments are also envisioned. For instance, a wall covering may also be used. For instance, the wall covering may be paneling, siding, wall paper, drywall, plywood, or other wall material, or may be a pad or part of a pad that is placed underneath or on the paneling, siding, wall paper, drywall, plywood, or other wall material. The present embodiments may also be used as a roof covering, which may be shingles or plywood, or may be pad that is placed underneath or on the shingles or plywood associated with a roof.

Additionally, although in one embodiment, the liquid may be water, other fluids or liquids may be detected. For instance, heating oil, gas, or oil may also be detected.

Further, in one aspect, a proposed insurance claim may be generated by an insurance provider or an insurance provider remote processor or server from the liquid data received. The proposed insurance claim may relate to a homeowners or renters insurance policy, and cover damage to a dwelling or building. Additionally or alternatively, the proposed insurance claim may relate to a personal articles or vehicle insurance policy, and cover damage to personal articles or belongings, or a vehicle, respectively.

In another aspect, the present embodiments may relate to adjusting or generating, via one or more processors, insurance policies, premiums, rates, or discounts based upon an insured or dwelling having the damage mitigation functionality described herein. For instance, a home with the damage mitigation functionality may be likely to incur less damage or have less potential risk than other homes—all else being equal. If an insurance-related event were to occur to a home having the damage mitigation functionality, the expected damage or associated costs to repair the damage may be less than with conventional homes. Thus, an insurance provider may offer a discount on homeowners insurance for insured's having homes with the damage mitigation functionality and/or smart carpet or walling. An insurance provider remoter processor or server may calculate cost savings for insureds, such as a lower premium or increased discount, based upon receiving a notification from an insured that their home is equipped with the functionality mentioned herein.

VIII. Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the invention has been described with reference to the embodiments illustrated in the attached drawing figures, it is noted that equivalents may be employed and substitutions made herein without departing from the scope of the invention as recited in the claims.

We claim:

1. A system for detecting a leak or spill and mitigating losses resulting therefrom, the system comprising:
    a floor covering including:
        a sensor assembly operable to generate information when exposed to liquid,
        a processing element operable to determine a location of the liquid based upon the information from the sensor assembly, and
        a transmitter operable to transmit data regarding the liquid; and
    a software application operable to be executed on an electronic device including a memory element and a processing element, the software application being stored in the memory element, being executed by the processing element, and being operable to:
        receive data from the transmitter of the floor covering regarding the liquid, and
        display a message that liquid has been detected on the floor covering to facilitate mitigating losses caused by the leak or spill or the handling of an insurance claim.

2. The system of claim 1, wherein the sensor assembly further includes:
a first array of conductors spaced apart, parallel to one another, and oriented in a first direction;
a second array of conductors spaced apart, parallel to one another, and oriented in a second direction, orthogonal to the first direction, the second array of conductors overlaying the first array of conductors;
a first array of sensors, each sensor operable to detect electrical current flow and integrated with one conductor of the first array; and
a second array of sensors; each sensor operable to detect electrical current flow and integrated with one conductor of the second array.

3. The system of claim 2, wherein each conductor of the first array is electrically connected to a voltage supply and each conductor of the second array is electrically connected to electrical ground.

4. The system of claim 2, wherein the sensor assembly further includes a plurality of insulators, each insulator positioned between one conductor of the first array and one conductor of the second array.

5. The system of claim 2, wherein each sensor of the first array generates information that indicates an X-coordinate of the liquid and each sensor of the second array generates information that indicates a Y-coordinate of the liquid.

6. The system of claim 1, wherein the floor covering includes a quadrilateral frame to which the sensor assembly is attached.

7. The system of claim 1, wherein the floor covering includes a structural medium in which the sensor array is embedded.

8. The system of claim 1, wherein the software application is further operable to determine a time duration of change of the area of the liquid.

9. The system of claim 8, wherein the software application is further operable to determine whether the time duration of change is greater than a predetermined threshold, and contact emergency or security services if the time duration of change is greater than the predetermined threshold.

10. The system of claim 1, wherein the software application is further operable to display data from the insurance provider, wherein the data received from the insurance provider relates to:
a proposed insurance claim generated by the insurance provider or an insurance provider remote processor or server;
an estimate of damage generated by the insurance provider or an insurance provider remote processor or server; or
contact information for a repair company.

11. A system or detecting a leak or spill and mitigating losses resulting therefrom, the system comprising:
a floor covering including:
a sensor assembly operable to generate information when exposed to liquid, the sensor assembly including:
a first array of conductors spaced apart, parallel to one another, and oriented in a first direction,
a second array of conductors spaced apart, parallel to one another, and oriented in a second direction, orthogonal to the first direction, the second array of conductors overlaying the first array of conductors,
a first array of sensors, each sensor operable to detect electrical current flow and integrated with one conductor of the first array, and
a second array of sensors, each sensor operable to detect electrical current flow and integrated with one conductor of the second array,
a processing element operable to determine a location of the liquid based upon the information from the sensor assembly, and
a transmitter operable to transmit data regarding the liquid; and
a software application operable to be executed on an electronic device including a memory element and a processing element, the software application being stored in the memory element, being executed by the processing element, and being operable to receive data from the transmitter of the floor covering regarding the liquid, and
display a message that liquid has been detected on the floor covering to facilitate mitigating losses caused by the spill or leak or handling of an insurance claim.

12. The system of claim 10, wherein each conductor of the first array is electrically connected to a voltage supply and each conductor of the second array is electrically connected to electrical ground.

13. The system of claim 10, wherein the sensor assembly further includes a plurality of insulators, each insulator positioned between one conductor of the first array and one conductor of the second array.

14. The system of claim 10, wherein each sensor of the first array generates information that indicates an X-coordinate of the liquid and each sensor of the second array generates information that indicates a Y-coordinate of the liquid.

15. The system of claim 10, wherein the floor covering includes a quadrilateral frame to which the sensor assembly is attached.

16. The system of claim 10, wherein the floor covering includes a structural medium in which the sensor array is embedded.

17. The system of claim 10, wherein the software application is further operable to determine a time duration of change of the area of the liquid.

18. The system of claim 17, wherein the software application is further operable to determine whether the time duration of change is greater than a predetermined threshold, and contact emergency or security services if the time duration of change is greater than the predetermined threshold.

19. A computer-implemented method for mitigating losses resulting from a leak or spill, the method comprising:
receiving, via one or more processors, data from a floor or wall covering, the data including coordinates of an exposure to liquid on the floor covering;
determining or calculating, via the one or more processors, that a time duration that the liquid has been sensed exceeds a pre-determined threshold;
determining or calculating, via the one or more processors, an area covered by the liquid;
determining or calculating, via the one or more processors, a source valve in proximity to the area covered by the liquid that, if closed, will stop the leak or spill; and/or
directing, via the one or more processors, the source valve to automatically shut to stop the leak or spill and mitigate the damage caused by the leak or spill.

20. The computer-implemented method of claim 19, the method comprising:

transmitting, via the one or more processors, information regarding the liquid on the floor covering to an insured, home owner, and/or an insurance provider.

\* \* \* \* \*